Nov. 16, 1943.  P. R. GOLDMAN  2,334,619
TUBULAR STRUCTURE AND ARTICLES
Filed Aug. 7, 1942   2 Sheets-Sheet 2
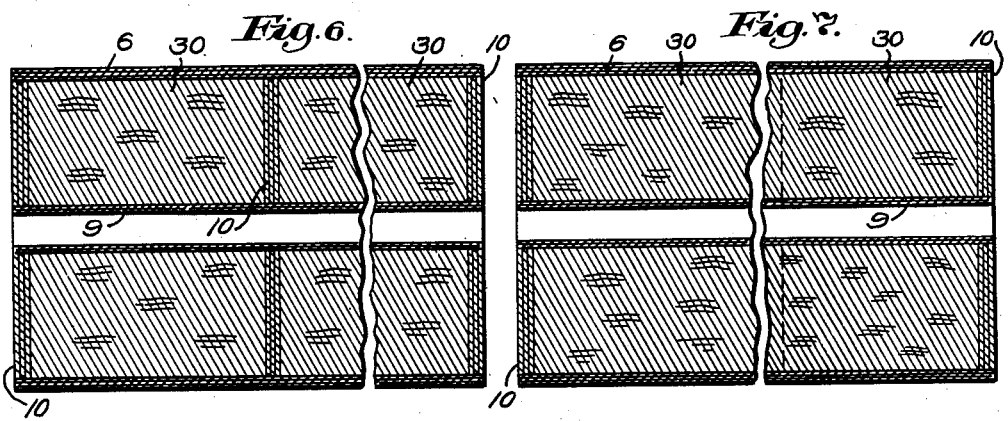
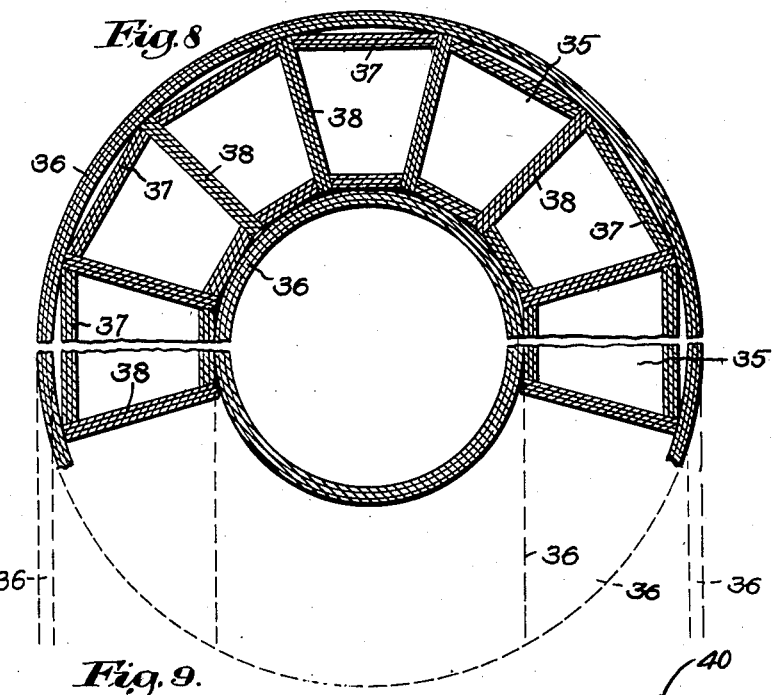
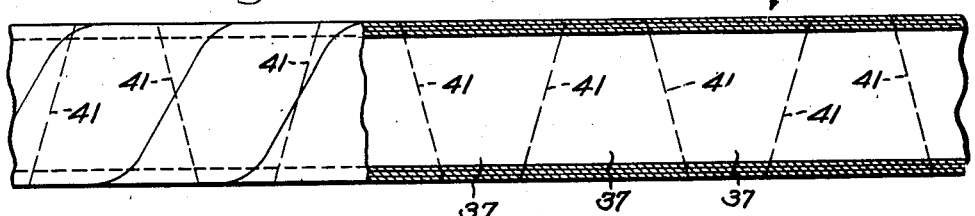
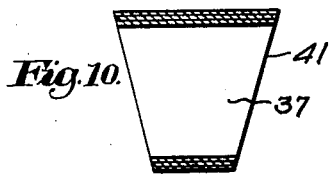
Inventor:
Paul R. Goldman
by Emery, Booth, Townsend, Miller & Weidner
Attys Patented Nov. 16, 1943

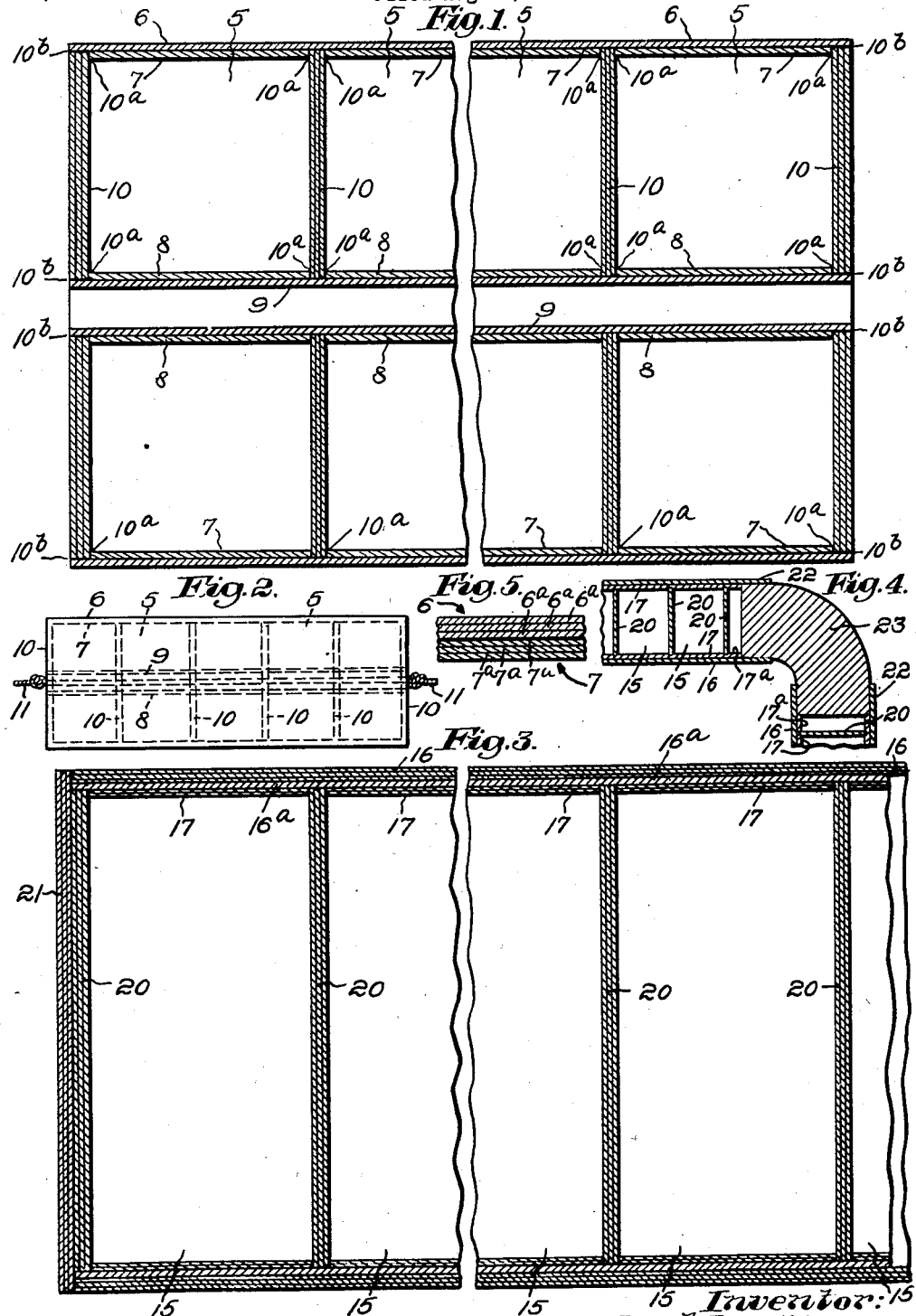

2,334,619

UNITED STATES PATENT OFFICE 2,334,619

TUBULAR STRUCTURE AND ARTICLE

Paul R. Goldman, Andover, Mass.

Application August 7, 1942, Serial No. 453,931

8 Claims. (Cl. 9—11)

My present invention relates to the maufacture of light-weight devices and structures including both filled and hollow types susceptible of a wide range of use and particularly adapted to serve as floating supports, pontoons, floats and the like. The invention aims to provide such devices and structures which may be constructed rapidly and in large quantities from available materials, chiefly wood, veneer and plywood, and applicable for example as the supporting means for life nets, rafts, preservers and for various other purposes.

In the drawings, illustrating by way of example certain embodiments of the invention:

Fig. 1 is a longitudinal section of one form of tubular supporting device, shown as non-filled, an intermediate portion being broken away to indicate its indeterminate length;

Fig. 2 is an elevation upon a smaller scale illustrating one manner of use of devices such as here concerned;

Fig. 3 is a view similar to Fig. 1 showing a modified construction;

Fig. 4 represents one means of angularly connecting structural lengths or sections such as that of Fig. 1 or the others;

Fig. 5 is a cross-section of a small portion of a wall of the device, partly diagrammatic and upon a much larger scale, to illustrate the wound ply construction;

Figs. 6 and 7 are longitudinal sections corresponding to Fig. 1 showing filled types of devices of the invention, of plural and single compartmental construction respectively;

Fig. 8 is a view partly in elevation and partly in section of a structure wherein the various sections corresponding for example to those of Fig. 3, are angularly related;

Fig. 9 represents a method of constructing such sections or tubular elements for angular association; and Fig. 10 shows one such tubular element separately, in section.

Referring to the drawings in more detail, and first to Figs. 1 and 2, the structure there shown, composed wholly or mainly of wood, comprises one or more chambers, compartments or sections each indicated generally by the numeral 5. Any desired number of such compartmental elements are connected into a unitary structure of any required length as by means of an external shell or casing 6.

In the example of Figs. 1 and 2 each of the sections 5, shown empty, comprises an outer sleeve or wall 7 of the selected diameter, thickness and cross-sectional shape, generally circular but which may be otherwise, as elliptical or other curved form, or polygonal shapes or combinations thereof. Centrally within the outer sleeve 7 is an inner sleeve or hollow tubular member 8 of corresponding or other cross-sectional shape but of much smaller diameter, so as to afford a relatively large annular space between the two sleeves, the latter defining the inner and outer circumferential walls of the respective compartments or sections. In this embodiment of Figs. 1 and 2 the several compartments 5 are further interconnected and supported in coaxial alignment as by means of a central spindle-like hollow tube or core 9, preferably continuous throughout the length of the structure as a whole and coextensive in length with the outer tube or casing 6.

These several tubular elements 6, 7, 8 and 9 are formed of thin wood strip material, wood veneer or plywood, wound into their tubular form. Each such element comprises any desired number of thicknesses or plies of the wood strip, plywood or veneering, being separately formed, in any desired lengths, and assembled into the unitary structure such as illustrated. Thus each of them is a spirally or otherwise wound thin wood veneer or plywood tubular device such for example as disclosed in my copending application, Serial No. 448,819, together with methods of making the same. Thus it will be understood that each of the tubular members 6 to 9 inclusive is made up of one or more winds or thicknesses of the veneer, which may be of paper thinness, these several windings not being indicated in Fig. 1 due to the drafting and scale limitations. A short length of the outer wall of one of the sections 5 of Fig. 1 is represented in cross-section upon a much enlarged scale in Fig. 5. There the several windings or individual wood strip or veneer layers are indicated by the addition of the reference letter "a" to the numerals of the respective tubular elements 6 and 7. A similarly enlarged section of the walls of the smaller tubular elements 8 and 9 would likewise show a ply formation.

Each of the several structural parts 6 to 9 inclusive thus is constructed as illustrated for example in my said copending application, each having any component windings adhesively secured and bonded together, with more or less impregnation, by the cementitious or other treating agents so as to form them into unitary and substantially homogeneous tubular wall structures of great strength and durability, all as disclosed for example in the copending application referred to, including such supplemental treatment as may be desired for rendering the elements water- and moisture-proof, fire-resistant, impermeable to air and to afford it such other characteristics as may be desired in any given use instance.

It should further be understood that the several sleeves or tubular elements 6 to 9 inclusive are initially made up in any desired lengths, the relatively shorter members 7 and 8 for the sections or compartments 5 being then cut to the appropriate lengths or they may be wound originally of such relatively shorter lengths. Thus the invention is not limited with respect to the length or axial extent of the section-forming elements, and it likewise is not limited as to the diameter, which may be varied from a minimum of approximately ¼ in. or less for the center tube 9 up to a number of feet for any of the tubular members. Likewise there are wide ranges available for the wall thickness, the width of the veneer stripping employed and the type of wood, all of which and other factors are selected and proportioned in accordance with the size and use requirements in any given instance, while the winding arrangement of the plywood or veneer may be spiral, as for example as in said copending application, whether or not cross wound, or it may be of convolute, parallel, overlapping, or other character.

Referring again more particularly to Fig 1, the tubular sections 5 further comprise the transverse end and intermediate walls 10. These also are preferably formed of wood and may individually consist of wood plates or discs of one-piece stock. Desirably, as illustrated, they are constructed of plywood such as the three-ply wood material shown in Fig. 1. These end wall members are shaped to conform to the cross-sectional contour of the outer and inner sleeve members 7, 8. They have an over-all diameter equal to or substantially the same as the outside diameter of the outer sleeves 7 and are centrally apertured upon a diameter conforming to the inside diameter of the inner sleeves 8. Thus they are adapted to be disposed in overlapping relation to the end edges of said sleeves 7 and 8.

In assembling the float or other device as a whole, a pair of the sleeve sections 7 and 8 is set in concentric relation with their edges at one end respectively abutting the outer and the inner peripheral portions of an end member 10. The sleeves and end wall are bonded together at their abutting edge portions by suitable waterproof or other glue, cement or other bonding agent, depending on the purpose and circumstances of use for the finished device, such for example as employed in the formation of the tubular elements themselves, including such agents as urea formaldehyde glue, Bakelite glue, compositions of the Tego type and other known substances affording a strong sealing union between the parts, as indicated at 10a, 10a, etc. In similar fashion a following end member, wall or partition 10 is secured at the opposite end edges of the sleeve members 7, 8, other sleeves and wall members being correspondingly added to build up a continuous structure of any desired length. While in Fig. 2 the several sections 5 are shown as of the same length, they may vary substantially as to relative length and also as to their number in a given over-all length, some or all of the intermediate cross walls or partitions 10 being omitted.

In a completed tubular structure of Figs. 1 and 2 the central tube or core 9 is disposed within the plurality of aligned sections, all of which are circumferentially secured and further structurally united by the outer shell or tubular casing 6. It will be particularly noted that the core tube 9 and the outer casing 6 are of a length to extend out at their opposite ends across the outer end walls 10, terminating flush with the outer faces of the latter. The surface areas between these extended end portions of the casing 6 and core 9, respectively, and the adjacent edge portions of the end walls 10 are bonded or united, as by gluing, cementing and the like as previously mentioned, with or without heat and pressure depending on the agent employed, as indicated in Fig. 1 at 10b, 10b, etc. This additionally insures a tight and substantially homogeneous union at the ends of the structure, effectively sealing it against passage of water or other fluid.

The order and manner of assembly of the several elements may be such as found most convenient for the structure of a given length and diameter. For example, any number of sections composed of the outer and inner sleeves 7 and 8 and the end walls or partitions 10 may first be built up to the desired length, the core member 9 and the outer casing 6 being then applied respectively through and over the assembled sections. A layer of application of glue, cement or other agent such as above referred to is applied over the entire circumferential area between the central sleeve 9 and the inner sectional sleeves 8, and also between the outer sleeves 7 and the inner surface of the outer casing 6. In other instances the procedure may be to build up the tubular sections progressively about the central tubular member 9 and within the outer shell 6, by positioning about and within said members respectively the end wall 10 and sleeve pair 7, 8 for a first section, followed by the end wall and sleeves for a succeeding section, and so on, with attendant bonding or gluing of the contacting circumferential and other surfaces in the manner previously described. Or the assembly may be by a combinational procedure, any plurality of the sectional chambers being made up and installed relative to the core and casing elements 9 and 6, followed by one or more other sections.

In Fig. 3 I have illustrated a modified structure, again having its longitudinal walls composed of tubular elements of wound thin wood, veneer or plywood. Here the longitudinal passage such as provided in the embodiment of Figs. 1 and 2 for the reception of a rope, cable or the like 11, is omitted. As in the previous instance, the device of Fig. 3 may be formed internally as a single section or in a number of connected sections, several of which are indicated at 15, 15, etc., in Fig. 3.

Such sections 15 of Fig. 3 comprise tubular wound veneer or plywood elements 17 which may be generally similar to the sleeve elements 7 of Fig. 1, being represented in Fig. 3 as comprising two plies or windings. Their respective ends are secured in abutting relation to three-ply cross-walls 20 in a generally similar manner as for the end walls 10 of Figs. 1 and 2. Surrounding the several aligned sleeves 17 is a connecting tubular casing 16 firmly bonded circumferentially to the several sleeves 17 as by the layer of adhesive, connective bonding or impregnating agent indicated by the intermediate layer 16a which may be of the type of composition available in sheet form, laid between the sleeves 17 and the outer casing or shell 16. It will be understood that the illustration in Fig. 3 is somewhat diagrammatic and not to scale, with thicknesses exaggerated for greater clarity.

Similarly as in Fig. 1 the casing 16 is of a length to extend out into overlapping relation with the circumferential edge of the terminal cross wall 20, the abutting surfaces of these parts being bonded and sealed, in some such manner as previously described. As a further strengthening and sealing means at the ends of the structure, I have shown in Fig. 3 an end plate or cap 21, preferably of plywood, of a diameter and shape to overlap and conform to the end edge of the casing 16. This terminal cap is secured and bonded to the end of the casing 16 and against the outer face of the adjacent cross wall 20, over the entire flat inner face of the cap. The latter affords additional insurance against passage of fluid at the ends of the structure. If desired similar caps, with central apertures aligning with that of the central core 9, may be employed in connection with the device of Figs. 1 and 2, and also Figs. 6 and 7.

Cylindrical or other tubular structures such as in Fig. 3 are particularly adapted, among other uses, to serve as the supporting or skeleton elements of floats and rafts of the type in which ropes are secured at one of their ends around such support or frame, with their other ends left free to trail in the water. It will be understood that the support structure of Fig. 3, as well as of the other figures, may be made of any desired length, such as 10, 12, 15 feet or more. A number of such supports or floats, of any convenient length, may be disposed in general parallelism or otherwise and inter-connected by ropes, canvas, netting or the like. Or a number of these floating supports may be cross-connected at their ends by similar tubular or other means so as to form rectangular or other frames or enclosures.

In Fig. 4 I have illustrated more or less diagrammatically one means of angularly connecting two lengths of the tubular structure such as that of Fig. 3 but applicable also to the form of Fig. 1 or the others. As there shown on a much smaller scale, two lengths of the main tubular device to be connected have their casings 16 extended at the ends and left open beyond a last cross wall 20, so as to provide a projecting flange 22. These flanges are adapted to receive one end of an arcuate connector or block 23. This may comprise a solid or hollow section of wood or other material of adequate strength but relatively light in weight. If desired it may be of tubular construction formed of wound veneer or plywood such for example as the angular unions disclosed in my copending application already identified. The receiving flanges 22 are of a length to overlap substantially onto, or within, the corresponding ends of the connector 23 to which they are firmly secured, as by bonding in the manner previously mentioned, or otherwise. The ends of such connector may extend in so as to abut any adjacent cross wall 20, or where the end section is of considerable length an inner sleeve 17a may be provided at the inner end of the flange 22, between the first cross wall and the inner end of the connector 23, the latter abutting and seating against the end edge of such sleeve 17a.

Referring now to Figs. 6 and 7 I have there represented further embodiments of the invention, differing from those of the previous figures mainly in that the single sectional device of Fig. 7 and the plural sectional device of Fig. 6 contain a filling medium. Accordingly similar reference numerals are applied on these figures as for Figs. 1 and 2, and in respects not otherwise particularly mentioned the construction as shown in Figs. 6 and 7 may be regarded as similar to that of said prior figures. While in Figs. 6 and 7 the devices are illustrated as of the centrally apertured type of Figs. 1 and 2, it will be understood that a filling, reinforcing and water or other fluid excluding medium such as represented in Figs. 6 and 7 may also be employed in connection with the structure of Fig. 3 and of the others.

In said Figs. 6 and 7 the outer casing 6, the central core 9, and the transverse walls 10, including the outer terminal end walls and any intermediate cross wall such as that indicated in Fig. 6, may be constructed, secured and bonded together similarly as already described in connection with the preceding figures.

While various materials may be employed for the filling and water-excluding medium, including for example masses of kapok or other suitable light-weight substance, I preferably employ a light-weight wood such as the various grades of balsa. Blocks, bodies are sections of balsa, or of the other materials mentioned, are indicated in Figs. 6 and 7 by the numerals 30. Where balsa wood is thus employed, discs or blocks thereof are formed of a shape and size to fit snugly within the casing 6, and appropriately apertured to receive and fit snugly around the core 9, where such latter is employed, in the apertured construction.

In a sectional structure such as that of Fig. 6, these balsa wood elements 30 for the respective sections may be of one piece or otherwise. The same also applies in connection with the non-sectionalized embodiment of Fig. 7, in which lengths of the inner balsa wood element 30 may be abutted endwise, as indicated by the broken line at the right-hand portion of Fig. 7. These balsa bodies 30 of Figs. 6 and 7 are preferably secured and bonded to the contacting veneer or plywood tubular and transverse wall elements similarly as for the inter-connection of the latter. It will be seen from Figs. 6 and 7 that the inner sleeve members such as 7 and 8 of Fig. 1 or 17 of Fig. 3 may be omitted in these filled embodiments, or if preferred they may be employed.

In addition to a reinforcing and connective function, the filler or base means as represented in Figs. 6 and 7 serves the further important purpose of excluding water in the event that the containing or covering tubular wall 6 or an end wall 10 should be punctured or perforated as by machine gun or rifle bullets in the course of hostile attack. Exposed or non-covered balsa wood itself is unsatisfactory for use as a supporting float in water, particularly sea water. Due to its natural porosity and cellular structure it becomes "water-logged" and unserviceable for supporting purposes, in a comparatively short time. But in the veneer or plywood covered balsa constructions such as represented in Figs. 6 and 7, the supporting efficiency is greatly extended. In the event that one or more bullet holes are formed in the enclosing veneer or plywood covering, the balsa wood prevents the rapid entrance of water such as might otherwise fill the corresponding section or the entirety of the float where it is of a single-section form. Unless substantial areas of the veneer covering are torn away, these structures will remain afloat for long periods, only a relatively small amount of water being admitted or absorbed by the balsa wood, even through a number of punctures in relatively close proximity. Indeed it is found that the action of the balsa wood is such, by reason of its inherent structure, that it tends to swell rapidly around and into a bullet perforation, with more or less of a self-sealing action.

In Figs. 8 to 10 I have shown a further construction utilizing wound veneer or plywood in tubular form, such for example as referred to in my prior application previously identified. The tubular structure of Fig. 8 may be regarded as a curve, arcuate or angular form of the device such as illustrated and described in connection with any of the preceding figures. While for the purposes of the disclosure I have shown in Fig. 8 a tubular device which is completed through a full 360°, to full circular form, it will be understood that any segmental or arcuate length thereof may be employed, as for example in the formation of angular unions and connections such as presented by the element 23 of Fig. 4, or as a semi-circular end piece for a raft or float, as indicated by the dotted lines.

In Fig. 8 the outer tubular element or casing 36 corresponds to the casing or shell 6 of Figs. 1, 6 and 7 or 16 of Fig. 3 and may be similarly constructed, as of the wound veneering or wood stripping, in the general manner also as in my prior application. The inner tubular elements of the several sections or compartments 35 comprise lengths 37 of tubular wound veneering, one of which is shown separately in section in Fig. 10.

One manner of rapidly and efficiently constructing these tubular elements or sleeves 37, with little or no waste, is illustrated in Fig. 9. In the latter figure a short length of tubular wound veneering is indicated in general by the numeral 40. This tube 40 is cut transversely, along the angularly related and oppositely inclined lines, as indicated in Fig. 9 by the broken lining at 41, 41, etc. By equally distributing the cut lines 41 along the tube 40, a corresponding number of identical tubular sections of the desired length are provided, alternate sections being oppositely positioned transversely, in their initial positions in the tubular stock 40. By arranging any of these sections with their longer wall portions adjoining, they may be disposed in the angular or arced relation as seen in Fig. 8. The angle of inclination of the end cuts 41, and the length of the sections 37, may be variously selected as appropriate for the particular radius of curvature desired for the structure as a whole. The truncate or segmental sections 37 may be directly abutted, and preferably bonded, end to end, or may be assembled with intervening cross walls 38 similarly as in Fig. 1, and they may be hollow or serve as covering for balsa or other filler material, in the manner of Figs. 6 and 7. The curved tubular casing 36 may be formed in arcuate sections of any desired length, into which the tubular elements 37 are inserted, or it may be formed by winding the veneering or other strip material about the assembled sectional elements 37.

My invention is not limited to the particular embodiments thereof as herein illustrated and described, its scope being set out in my claims as follows:

I claim:

1. A tubular structure for supporting and other purposes comprising in combination, one or more pairs of plural-ply wound veneer sleeves in laterally spaced coaxial relation one within the other, centrally apertured plywood cross walls secured at the respective ends of the sleeves and forming a closed annular compartment between the sleeves of each pair, a hollow tubular wound veneer core positioned in and bonded to the inner sleeve of said pair or pairs and overlapping the cross walls, and a tubular outer casing of plural-ply veneer surrounding the sleeve pair or pairs and being coextensive with the core so as to overlap the peripheral edges of the cross walls, said casing bonded to the outer sleeve of the pair or pairs and to the cross walls.

2. A tubular structure according to claim 1 including in combination therewith wooden cap members of a shape and size conformant to the casing ends and being bonded to them and against the outer faces of the terminal cross walls.

3. A tubular structure for supporting and other purposes comprising in combination, a tubular element of wound plural-ply veneer, wooden transverse wall members of a shape and size to fit against the end portions of the tubular element and being bonded to it, and an outer casing of plural-ply wound veneer of a diameter and cross-sectional form to fit snugly around the tubular element and of a length to overlap the peripheral edges of said transverse wall members, said casing bonded to the latter and to the outer surface of the tubular element.

4. A float device comprising in combination a body of balsa wood of selected size and shape including opposite end faces and a connecting side wall, a casing of plural-ply wound veneer positioned on the balsa body in closely surrounding relation to its side wall, and plywood plates disposed at and bonded to the end edges of said casing and against the end faces of the balsa body.

5. A float device according to claim 4 wherein the balsa body is centrally apertured from end to end and having in combination a wound plural-ply veneer tube positioned in the aperture, the plywood end plates having corresponding apertures to receive said tube and being bonded to the latter around said apertures 6. A tubular structure according to claim 1 wherein each annular compartment between sleeves of the pair or pairs has fitted therein a mass of balsa wood.

7. A tubular structure comprising a plurality of elongated tubes formed of a plurality of plies of wound thin wood stripping, said tubes disposed in endwise angular relation one to another, and a curvilinear connector element of a cross-sectional shape and size conformant to that of said tubes, said connector element having its ends fitted and secured to the adjacent ends of adjacent tubes.

8. A buoyant tubular structure for rafts, nets, floats and the like, said structure comprising a hollow tubular casing having its longitudinal wall formed wholly of a plurality of plies of wood veneer concentrically wound in superposed relation and united by a water-resistant bonding agent, impermeable plate-like plywood transverse wall members at the ends of the casing and bonded thereto in end-sealing relation by similar water-resistant bonding means, and one or more internal transverse wall members similarly bonded at the inner face of the casing and dividing the latter into a plurality of water-tight sealed compartments.

PAUL R. GOLDMAN.